(12) United States Patent
Cieslik

(10) Patent No.: US 8,125,165 B2
(45) Date of Patent: Feb. 28, 2012

(54) MOTORIZED SCREEN CONFIGURATION AND GROUPED CONTROL METHODS, AUTOMATIC CONTROLLER FOR IMPLEMENTING THIS METHOD AND HOME AUTOMATION INSTALLATION COMPRISING SUCH AN AUTOMATIC CONTROLLER

(75) Inventor: Franck Cieslik, Succieu (FR)

(73) Assignee: Somfy SAS, Cluses (FR)

( * ) Notice: Subject to any disclaimer, the term of this patent is extended or adjusted under 35 U.S.C. 154(b) by 420 days.

(21) Appl. No.: 12/453,517

(22) Filed: May 13, 2009

(65) Prior Publication Data

US 2010/0006240 A1 Jan. 14, 2010

(30) Foreign Application Priority Data

May 15, 2008 (FR) ...................................... 08 53148

(51) Int. Cl.
*E06B 9/264* (2006.01)
(52) U.S. Cl. .......................................... 318/101; 318/85
(58) Field of Classification Search .................... 318/85, 318/101, 102, 112, 264–266, 466–468, 625, 318/626
See application file for complete search history.

(56) References Cited

U.S. PATENT DOCUMENTS

| | | | | | |
|---|---|---|---|---|---|
| 3,654,732 | A | * | 4/1972 | Schacht | 49/127 |
| 4,020,889 | A | * | 5/1977 | Karoll | 160/120 |
| 4,505,070 | A | * | 3/1985 | Clipp et al. | 49/82.1 |
| 4,688,895 | A | | 8/1987 | Jacob | |
| 4,753,281 | A | * | 6/1988 | Wagner | 160/84.06 |
| 7,240,716 | B2 | * | 7/2007 | Nichols et al. | 160/310 |

FOREIGN PATENT DOCUMENTS

| EP | 0 913 748 A | 5/1999 |
|---|---|---|
| JP | 08 210054 | 8/1996 |

* cited by examiner

*Primary Examiner* — Bentsu Ro
(74) *Attorney, Agent, or Firm* — Dowell & Dowell, PC

(57) ABSTRACT

An automatic control mechanism for a group of motorized screens in which each screen includes a load bar that is displaced according to a predefined travel and wherein the control mechanism determines a shift parameter between a first reference position of each screen and a second reference position, one of these two reference positions being a reference position common to the screens of the group. The control mechanism takes into account at least one shift parameter to obtain, following a control command, at least the alignment of the load bars that have been displaced.

17 Claims, 7 Drawing Sheets

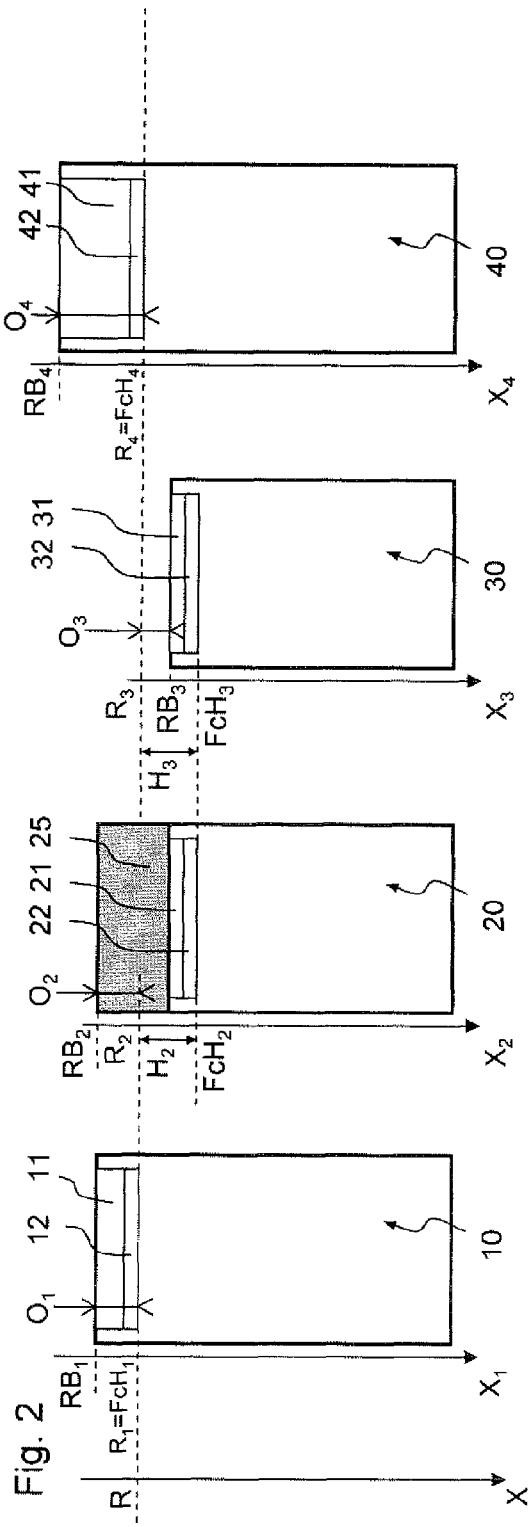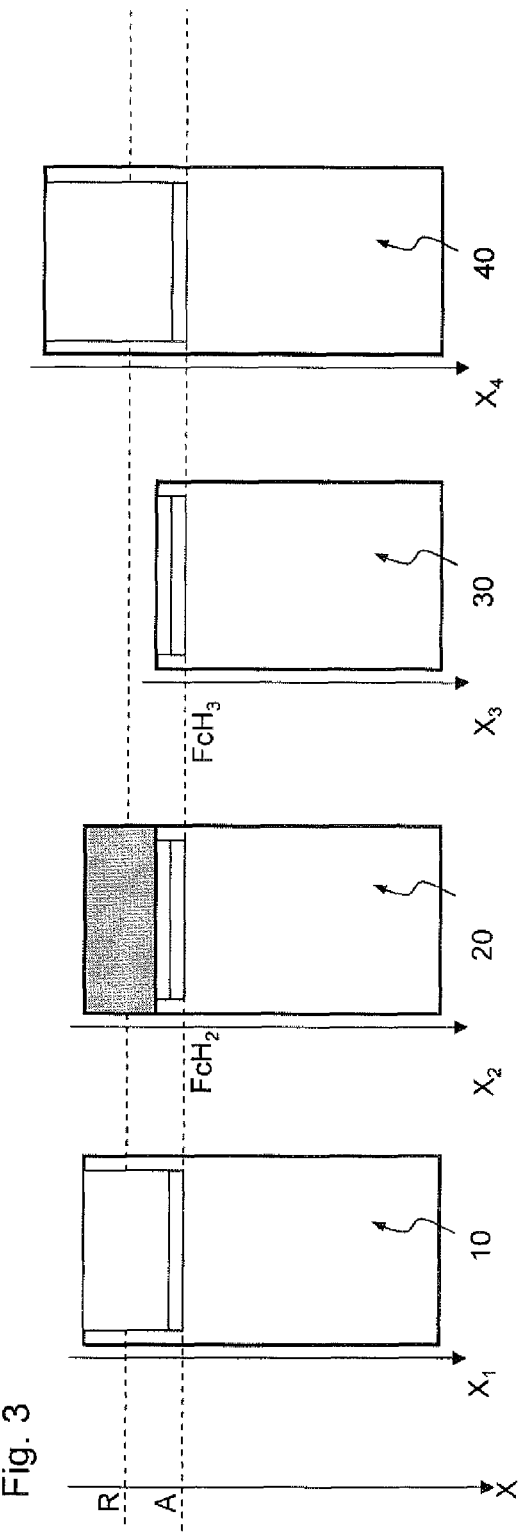

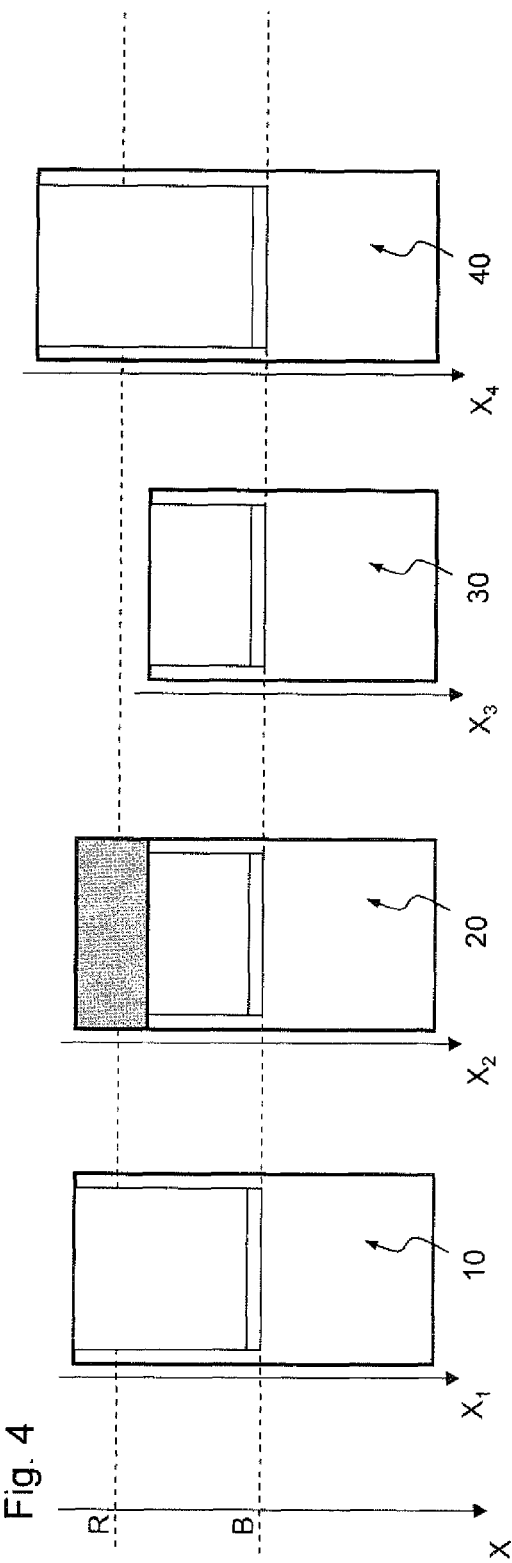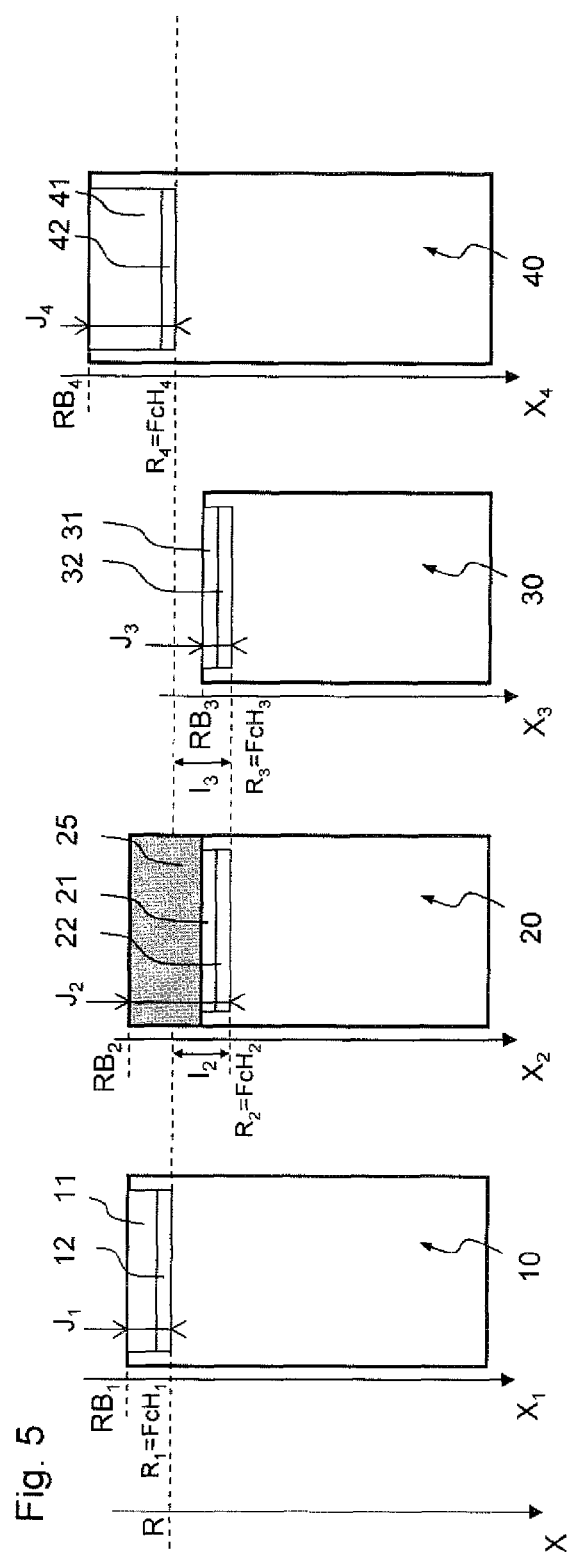

MOTORIZED SCREEN CONFIGURATION AND GROUPED CONTROL METHODS, AUTOMATIC CONTROLLER FOR IMPLEMENTING THIS METHOD AND HOME AUTOMATION INSTALLATION COMPRISING SUCH AN AUTOMATIC CONTROLLER

The present invention relates to a method for configuring and for the grouped control of several motorized screens equipped with a load bar. These screens can be venetian blinds or other similar blinds. This type of screen comprises at least a lifting cord, linked to the load bar, that is wound around a shaft driven rotation-wise by an actuator. The screens can also be windable fabric blinds, even roller blinds. In all cases, it is necessary for the measurement of the position of the load bar of a screen to be as independent as possible of the position of the screen.

To drive a number of motorized screens, it is known to use an automatic control mechanism making it possible to manage the position and/or the orientation of the slats of the screens that make up the group so that each screen has the same position and/or orientation of the slats according to a grouped control. The driving is generally handled by a "master-slave" type operation in which a screen, called "master", drives the other screens, called "slaves", of the group. The slave screens reproduce the configuration, that is, the position and/or the orientation of the slats of the master screen, as described in the application JP-A-08210054. As specified by EP-A-0913748, the adjustment of the position and/or the orientation of the slats of a screen can be obtained by the calculation of motor or time pulses by means of a microprocessor. A correlation between these pulses and the position of the screen or the orientation of the slats can be defined directly.

In the preceding applications all the screens have substantially the same travel and are aligned. The travel of a screen is determined by the distance traveled by the load bar between a first and a second predetermined position. The first position, called top end-of-travel, generally corresponds to a position of the load bar for which the screen is completely open. The load bar then reaches a top end-stop. This top end-stop is a stop position desired by the user. It can be different from a realignment end-stop intended to resynchronize a counting means with the actual travel of the screen in case of drift in the counting means. The second position, called bottom end-of-travel, corresponds to a position of the load bar such that the screen is completely closed. The load bar then reaches a bottom end-stop. When the screens are aligned, they generally have the same top ends-of-travel.

The position measurement for the load bar of a screen is obtained in relation to a predetermined reference position. Moreover, a calibration operation can be provided that makes it possible to define one and the same reference position for the screens of the group after installation. This reference position is described as a common specific position corresponding to all the top ends-of-travel of the screens of the group. Thus, when a command to displace the load bars to a desired position of the travel of a screen is executed, each load bar of the screens of the group is displaced to this position defined in relation to the top end-of-travel of each screen corresponding to the common reference position. At the end of the manoeuvre, all the load bars are situated at the same position and are aligned.

Such solutions do not make it possible to obtain an alignment of the load bars when the screens have different travels and, more particularly, when a top end-of-travel is not at the same position as those of the other screens of the group. In this case, the load bar of a "shifted" screen, having a reference position corresponding to its top end-of-travel, different from the other top ends-of-travel, cannot reach a position for which it can be aligned with the other load bars of the group. The offset obtained corresponds to the difference in the reference positions. The current grouped control methods are not designed to incorporate this deviation. A screen of the group is driven from its intrinsic reference position which is not linked to the reference positions of the other screens of the group. Similarly, there is no provision for setting the intrinsic reference position of a screen by taking account of the screens of the group having different ends-of-travel or realignment end-stops.

The invention proposes a method of configuring a number of screens that overcomes the above drawbacks.

To this end, the invention relates to a method of configuring a group of motorized screens in which each comprises a load bar which is displaced according to a predefined travel. This method is characterized in that it comprises a step consisting in determining, for each screen of the group, a shift parameter between a first reference position of the screen and a second reference position, one of these two reference positions being a reference position common to the screens of this group of screens.

Thanks to the invention, the method makes it possible to set the screens of a group, including shifted screens, in order to be able to obtain, on stopping, at least the alignment of the load bars of the screens that have been displaced following a command. The shift parameter determined using the inventive method can be directly taken into account for the alignment of the load bars. This method depends on the driving method retained to control the group. To master the position of a load bar of a screen, the latter has a counting means that measures the position of the load bar in relation to an intrinsic reference position of the screen. The reference position corresponds to a particular position of the load bar. Advantageously, the position of each screen of the group is determined in the same way, by identical counting means. Thus, the increments between two positions are identical. The relative positioning of a load bar in relation to another is more accurate. The alignment is then easier to obtain.

The shift parameter deriving from the method of configuring the screens of the group also offers the benefit of facilitating the execution of a command to return to a predefined intermediate position. The intermediate position is defined in relation to a master screen of the group. To obtain the alignment of the load bars of the other screens in this position, this position must be retranscribed in the frame of reference linked to each screen. The different shift parameters are directly linked to this retranscription.

These parameters preferably correspond to a variation of length or of travel, that is accurate and stable, or to a manoeuvre time. These parameters can be recorded by simple methods following a particular positioning of one or more screens.

Advantageously, each screen of the group of screens is coupled by counting means which defines the relative position of the load bar of this screen in relation to the first reference position, which is specific to the screen, or in relation to the second reference position.

The second reference position can be a realignment position of the counting means specific to each screen, whereas the first reference position is a reference position common to the group of screens.

As a variant, the second reference position is a reference position common to the group of screens. In this case, the first reference position of a screen to be configured can be an end-of-travel position of that screen.

The invention can be illustrated through two driving modes.

A first driving mode consists in dissociating the reference position, specific or intrinsic to a screen, from the top end-of-travel position of this same screen. The shift parameter makes it possible to define this intrinsic reference position independently of the top end-of-travel. It is then possible to obtain a reference position common to all the screens of the group. Driving becomes simple and direct since the benchmark for manoeuvring a screen is common to the other screens. The position to be reached is the same for all the screens.

A second driving mode consists in having the reference position and the top end-of-travel of a screen to be the same. In this case, when the reference position of a shifted screen is different from that of the master screen, this deviation is incorporated for the driving of the shifted screen. The shift parameter corresponds to the difference in position between the reference position of a screen and a common reference position. The driving of the shifted screens is not direct since it is necessary to correct the position to be reached linked to the master screen using the shift parameter. This correction must be made on each manoeuvre.

These two driving modes thus make it possible to take account of the shift of the screens. They therefore make it possible to be independent of the installation of the screens. The alignment of the load bars is always assured and accurate, even if the installation comprises screens with different travels due to a different positioning or to a technical lintel. The alignment of the load bars is on the one hand aesthetic but also allows for better mastery of sunlight/brightness inside the building. Obviously, an individual control of a screen of the group is still possible.

Advantageously, a preliminary step is provided that consists in defining a master screen for the group of screens, this master screen serving as a reference for the execution of the configuration method. In this case, the second reference position mentioned previously is advantageously equal to the first reference position of this master screen.

According to a variant of the invention, the configuration method comprises at least the following basic steps:
  i). positioning the load bar of a selected screen from the screens of the group of screens at a common reference position of this group;
  ii). recording this common reference position;
  iii). positioning the load bar of the selected screen in a configuration position corresponding to a particular position of the load bars of the screens to be configured;
  iv). recording this configuration position;
and, for each screen of the group,
  v). positioning the load bar of the screen to be set at the configuration position of the step iii);
  vi). recording this third position; and
  vii). using these three recorded positions to determine the shift parameter of the screen to be configured.

According to another aspect of the invention, the method comprises at least the following basic steps:
  a) positioning the load bar of a selected screen in a configuration position corresponding to a reference position of a screen to be configured;
  b) recording this configuration position,
  c) using this record to determine the shift parameter of the screen to be configured.

The invention also relates to a grouped control method for the displacement of a group of screens. More specifically, to obtain, following a control command, at least the alignment of the load bars that have been shifted, this grouped control method takes into account at least a shift parameter between a first reference position of a screen and a second reference position, one of these two reference positions being a reference position common to the screens of the group of screens.

The alignment of just the load bars that have been displaced presents the advantage of being able to retain a desired configuration for certain screens of the group. This may be the case if the screens in a room have been closed to obtain darkness. It is then desirable for the automatic control mechanism managing the frontage not to change this arrangement. Conversely, the alignment of all the load bars, even those that have not been displaced, may be desired. For example, if there are no people in the building, an alignment of the load bars and common management of their position may be desired. To obtain this function, it is essential for the alignment to be possible. The alignment of the load bars is possible when the travel of the screens is common, that is when the load bars of the screens of the group have an identical position in a frame of reference linked to the group and not just to a single screen.

Advantageously, a step for the execution of the control command by a first screen, initially called master, then, in shifted mode, the other screens of the group, called slaves, is provided. A "master-slave" type operation makes it possible to better master the driving of a group because the master screen serves as a reference on which the slave screens can be based.

Preferably, following a grouped control, the displacement of the load bar of the slave screens is performed slightly after the load bar of the master screen has reached their respective positions. This shift facilitates the driving of the screens. In practice, when the master screen is stopped, it is desirable for the slave screens to be aligned in the same position. The time taken to process the information by the automatic control mechanism induces a slight time shift in the command to stop the slave screens. Consequently, if the starting up of the displacement of the master and slave screens is simultaneous, the slave screens will be stopped after the master screen, which is reflected by a position shift. To remedy this and align the load bars, it is then necessary to drive the slave screens in the other direction. The driving of the screens becomes more complex. By incorporating a time shift between the master screen and the slave screens, this backward return can be dispensed with.

According to another advantageous aspect of the invention, the control method comprises at least the following steps:
  a) following a command to move the group of screens, displacement of at least a load bar of a screen of this group, and
  b) following a stop command, positioning of the load bar of each screen whose load bar has been displaced, so as to obtain an alignment of the load bars that have been displaced.

The step b) advantageously comprises, in addition, the position of the load bar of the screens whose load bar has not been displaced, so as to obtain an alignment of all the load bars.

The movement command of the step a) can be a command that aims to displace the load bar to a predefined position, whereas the stop command of the step b) is executed automatically as soon as this position is reached.

It is also possible to provide for the alignment of the load bars of the step b) to be obtained by the displacement of the load bar of each screen to a position determined in relation to a reference position specific to each screen.

The invention also relates to an automatic controller for controlling a group of screens that incorporates means of implementing the configuration method and/or a grouped control method as mentioned hereinabove.

Finally, the invention relates to a home automation installation comprising such an automatic controller and in which the motorized screens are fabric blinds or venetian blinds.

The invention will be better understood from reading the description that follows, given solely by way of example and with reference to the appended drawings in which:

FIGS. 2 to 5 are representations of the different screen deployment configurations of an installation whose screens are controlled by a method configured according to the invention;

Figure 1:
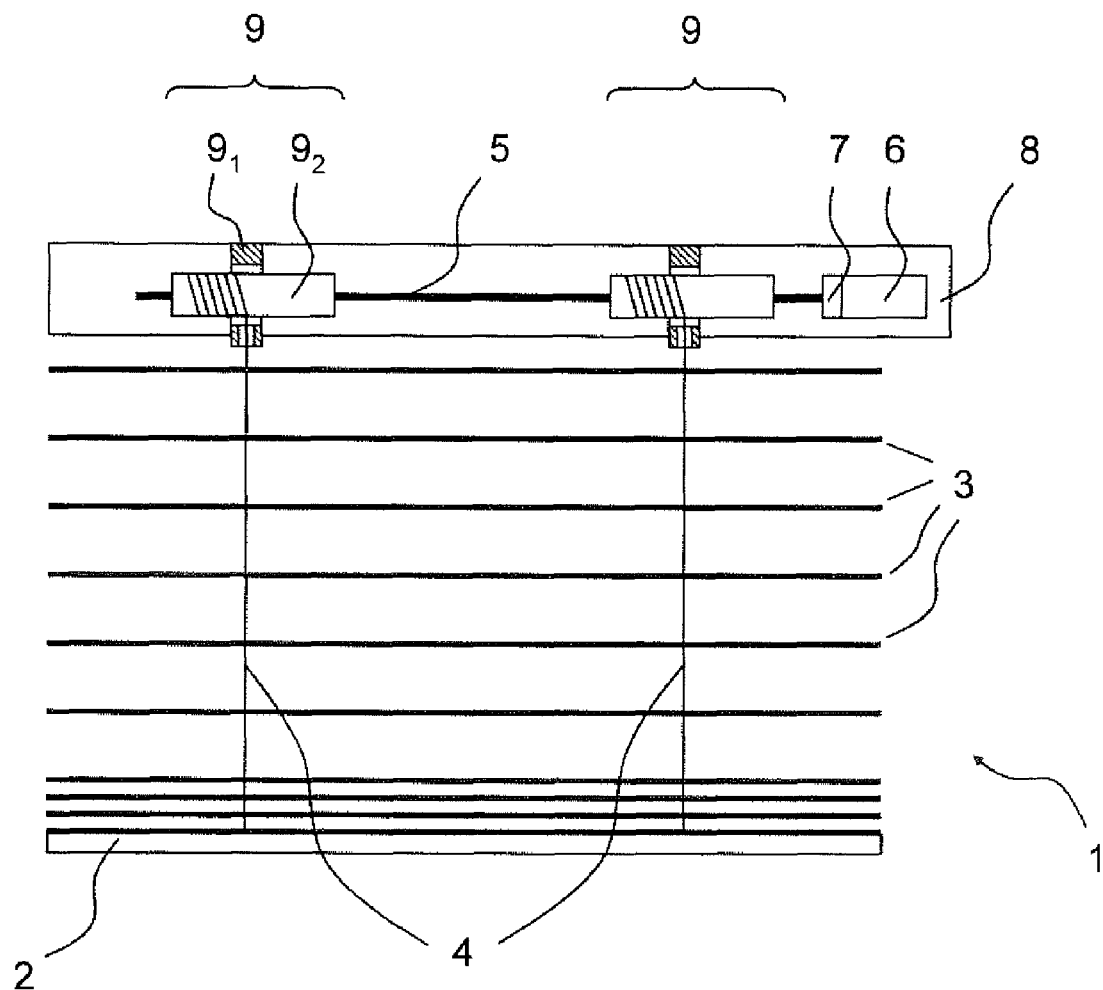
FIG. 1 is a representation of a screen that can be configured by the inventive method.

The inventive configuration method is intended to configure a number of screens equipped with a load bar. This type of screen can be a motorized venetian blind as illustrated in an installation 1 as represented in FIG. 1. The screen comprises a moving portion consisting of a load bar 2 and orientable slats 3, the moving portion being inscribed in a frame corresponding to the opening to be blocked off. The load bar 2 is linked to winding devices 9 by two cords 4. Each winding device 9 comprises a drum $9_2$ around which the corresponding cord 4 is wound and a guiding means $9_1$ making it possible to guide the cord towards the drum. The two drums $9_2$ are interlinked by a shaft 5. This shaft 5 is driven rotation-wise by an actuator 6. This actuator comprises counting means 7 making it possible to calculate the relative position of the load bar in relation to a reference position specific or intrinsic to the screen. This counting means can be an encoder measuring the number of turns made by the shaft 5 in relation to the predetermined reference position.

A means that is not represented of orienting the slats can also be provided. It can be independent of the winding device or be associated therewith. Generally, the winding devices 9 and the actuator 6 are integrally arranged within a box part 8.

When the installation comprises screens that have been shifted, that is, screens that do not have the same top end-of-travel because of a different setting or a shifted frame, it is necessary to configure each screen of the group in order to be able to optimize a grouped control. This configuration is essential if there is a desire to obtain the alignment of the load bars of the group.

Such an installation is illustrated in FIGS. 2 to 5. These figures represent an installation consisting of slave screens 20, 30 and 40 that have been shifted in relation to a master screen 10. Hereinafter, the term screen "n" will be used to designate one of the screens whose reference is expressed in the form "n0". Thus, the index 1 corresponds to the parameters relating to the screen 10, the index 2 to the screen 20, etc.

The travel of each screen is characterized by a top end-of-travel $FcH_1$, $FcH_2$, $FcH_3$, $FcH_4$, and a bottom end-of-travel that is not represented. The load bars of the screens 10, 20, 30 and 40 are respectively denoted 12, 22, 32 and 42. Each load bar is shifted according to a travel delimited by the top and bottom ends-of-travel. These ends-of-travel, set by the user, are defined in relation to a reference position $R_1$, $R_2$, $R_3$, $R_4$, specific to each screen.

A reference position $R_n$ of a screen "n" corresponds in principle to the counter zero setting of the counting means $7_n$ associated with that screen. Thus, the measurement of a position of the load bar of a screen "n" in relation to the reference position of the screen $R_n$ corresponds to the value directly read on the counting means $7_n$ associated with the screen. The reference position $R_1$ to $R_4$ of each screen 10 to 40 is determined in association with a shift parameter reflecting a relationship between a reference specific to a screen and a reference position common to the group. This relationship makes it possible to obtain the alignment of the load bars of the group of screens following a grouped control. Thus, according to the driving mode adopted, a specific configuration operation must be performed to determine these shift parameters. This operation is detailed hereinbelow.

The screens of the installation present different possible shifts between them. The screen 20 is equipped with a technical lintel 25, involving a shift downward $H_2$ from the top end-of-travel $FcH_2$ in relation to its reference position $R_2$. The screen 30 is smaller than the master screen 10. Its top end-of-travel $FcH_3$ is shifted downward by a value $H_3$ in relation to its reference position $R_3$. The ends-of-travel $FcH_1$ and $FcH_4$ of the screens 10 and 40 are identical. The screen 40 is distinguished from the master screen 10 in that its frame is prolonged height-wise above the frame of the screen 10.

Each screen "n" also has a realignment position $RB_1$, $RB_2$, $RB_3$, $RB_4$ for which the screen is in a stable reproducible configuration making it possible to realign the counting means $7_n$ associated with this screen. Generally, this position corresponds to an absolute end-stop in which the screen is completely retracted, the load bar having reached a physical end-stop. This end-stop is detected by the actuator automatically, either by current variation measurement or by a switch or by another equivalent means.

To avoid a drift in the counting system $7_n$ of an actuator, a synchronization operation is performed regularly for each screen. It consists in positioning the screen "n" at this realignment position $RB_n$ and in re-initializing the counting means $7_n$ associated with the screen "n" in relation to this realignment position. The re-initialization in relation to a specific position generally consists in defining the reference position $R_n$ for the count, commonly called "counter zero", for this position. In the present case, the reference position $R_n$ for the count corresponds to this realignment position $RB_n$. Following this operation, it is then necessary to re-initialize the counting means $7_n$ associated with the screen "n" in relation to the desired reference position $R_n$. This consists in modifying the benchmark, or counter zero, of the counting means $7_n$ according to a predefined fixed parameter. This parameter corresponds to the constant deviation between the realignment position $RB_n$ and the desired reference position $R_n$. Preferably, this parameter is expressed in the counting unit of the counting means $7_n$.

Hereinafter, when a position is measured by the counting means $7_n$ initialized in relation to realignment position $RB_n$ of the screen, a prime «'» is added to the measurement value. If the position is measured by the counting means $7_n$ initialized in relation to the reference position $R_n$, no signal is added to the measurement value. For example, the value $B_1$ designates the measurement of the position of the load bar 12 of the screen 10 expressed in relation to $R_1$, whereas the value $B'_1$ designates the measurement of the position of the load bar of the screen 10 expressed in relation to $RB_1$. The record of a position is the record of the value of a parameter measured by the counting means $7_n$ initialized in relation to the reference position $R_n$ or in relation to the realignment position $RB_n$. The realignment position $RB_n$ is considered as a reference position of a screen "n".

Following this synchronization operation, a reference position $R_n$ is associated with each screen of the group. The movement of the screens is thus mastered thanks to these reference positions $R_n$ defined in relation to a common reference R, as explained hereinbelow. A grouped control can therefore more easily be executed.

The application of the invention depends on the driving mode of the screens of the group. Thus, for each configuration method there is a corresponding predetermined driving mode. To illustrate it, two driving modes are detailed.

The principle of the first driving mode is as follows. For each screen "n", its reference position $R_n$ is determined so as to be aligned with all the other reference positions of the screens of the group and with a common reference position R. Consequently, the position X of a load bar calculated by a counting means of a screen corresponds to the same position X calculated by a counting means of another screen of the group. Thus, to be able to align the load bars, all that is required is to send the same position setpoint X to all the actuators of the group. Once the screens are configured, the driving of the screens is direct: the setpoint is the same for all the screens.

To obtain a common reference position R, it is essential for each screen "n" to incorporate a shift parameter in the driving system specific to the screen. In the installation described in FIG. 2, this is reflected in the parameters $O_1$, $O_2$, $O_3$, $O_4$. These parameters make it possible to position the benchmark $R_n$ specific or intrinsic to a screen "n" in relation to an arbitrary predetermined position and, more particularly, align the intrinsic reference position $R_n$ of a screen with a common reference position R of the group of screens.

In the present example, these parameters correspond to the deviation between the common reference position R and the realignment position $RB_n$ of the corresponding screen as defined previously, in the synchronization step.

It should be noted that the reference position $R_n$ of a screen "n" can be situated outside the travel of that screen, as represented for example, for the screens 20 and 30. This reference $R_n$ can also be virtual by being positioned beyond the physical end-stop $RB_n$ of the load bar as illustrated by the screen 30. The shift parameters $O_1$ to $O_4$ therefore make it possible to automatically and systematically redefine the intrinsic benchmark $R_n$ of a screen "n" in a synchronization operation.

The method of configuring the screens of the group according to this driving mode incorporates a step for determining the values of the shift parameters $O_n$. An exemplary embodiment is described in FIGS. 6 and 7. In this example, it is assumed that all the screens have identical counting means $7_n$.

Figure 6:
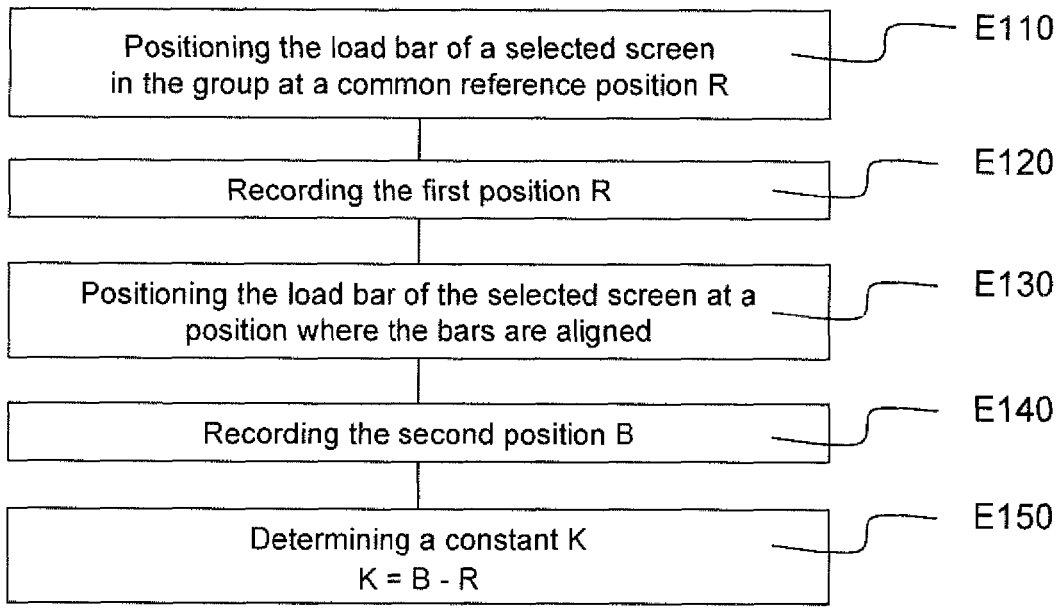
FIGS. 6 and 7 are flow diagrams of two series of steps relating to the determination of the shift parameter by the inventive configuration method.

Initially, a screen, for example 10, is selected with which the steps represented in FIG. 6 are implemented.

In a first step E110, the load bar 12 of the selected screen 10 is positioned level with the arbitrary common reference position R.

In a second step E120, the position R is recorded. In the example where the selected screen is the screen 10, the position R is measured by the counting means $7_1$ as equal to the value $R_1$ or to the value $R'_1$ depending on whether measurement is performed before or after reset in relation to the realignment position $RB_1$.

In a third step E130, the load bar of the selected screen 10 is positioned at the level of an arbitrary configuration position in which all the load bars of the group are aligned, for example, the position B illustrated in FIG. 4.

In a fourth step E140, the position B is recorded. As in the step 120, the value measured by the counting means $7_1$ for the position B can be expressed in the form $B_1$ or $B'_1$ In a fifth step E150, a constant K is calculated, corresponding to the difference between B and R, or K=B−R. According to the example considered, $K=B_1-R_1$ or $K=B'_1-R'_1$.

Figure 7:
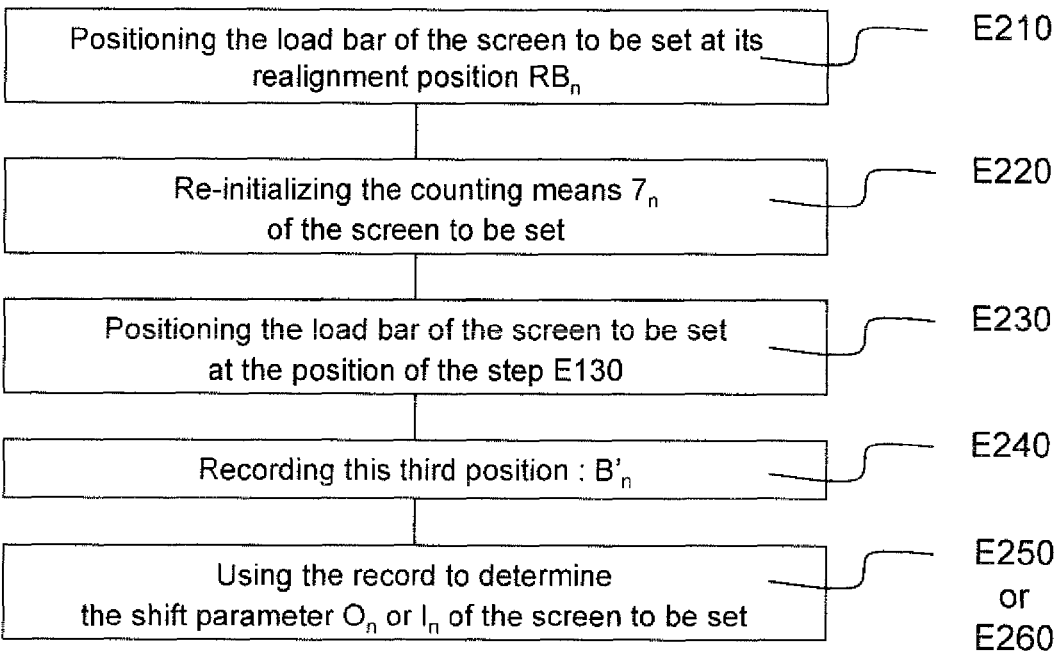

Then, for each screen of the group, the series of steps represented in FIG. 7 is applied.

In a first step E210, the load bar of the screen "n" to be configured is positioned at its realignment position $RB_n$.

In a second step E220, the counting means $7_n$ of this screen is initialized.

In a third step E230, the load bar of the screen to be configured is positioned at the level of a configuration position previously defined in the step E130, namely B.

In a fourth step E240, this position is recorded by the corresponding value $B'_n$, by taking as a reference the realignment position $RB_n$, the counting means $7_n$ being initialized in relation to this position $RB_n$ in accordance with the step E220.

In a fifth step E250, the shift parameter $O_n$ to be associated with the screen to be configured is then calculated. This parameter corresponds to the difference between $B'_n$ and K, that is $O_n=B'_n-K$.

Preferably, the common reference position R corresponds to the top most desired top end-of-travel of the screens of the group and/or the desired top end-of-travel of the master screen $FcH_1$, these positions possibly being identical.

The preceding steps E110 to E250 can also be executed in a different order from the moment when the shift parameters $O_n$ can be determined with these measurements. For example, the initialization of the counting means $7_n$ can be performed first.

As a variant, the steps E110 to E150 are not carried out, the configuration position of the step E230 is the arbitrary common reference position R and, for the calculation of the shift parameter $O_n$ in the step E250, it is assumed that K=0. It should be noted that this variant is not appropriate if the common reference position R is not in the travel of the screen to be configured, as is the case for the screen 30 in our example.

The recording can be assisted with automatic calculation of the parameters. A recording mode is entered into and, as soon as a characteristic position $B'_1$, $B'_2$, $B'_3$, $B'_4$ or R ($FcH_1$) is reached, it is recorded by pressing a specific key of an automatic control mechanism, for example by a long press on a button of a remote control. Recording can also be manual. In this case, the characteristic positions $B'_1$, $B'_2$, $B'_3$, $B'_4$ or R ($FcH_1$) are read from an interface reproducing an instantaneous value determined by the corresponding counting means $7_n$ and these values are re-transferred to the automatic control mechanism managing the group of screens. This can be performed via software, the programming then being done on a computer.

On completion of the above operations, the shift parameters make it possible align all the reference positions $R_n$ of the screens of the group with common reference position R, following a synchronization operation.

The principle of the second driving mode is as follows: the reference position $R_n$ specific to a screen corresponds to a specific position of the screen, such as the top end-of-travel $FcH_n$ defined by the user. Thus, the different reference positions $R_n$ are not mutually aligned.

As in the previous driving mode, a synchronization mode is provided in which each screen "n" returns to a realignment position $RB_n$ in which the counting means $7_n$ associated with this screen is re-initialized. The reference position $R_n$ and, consequently, the top end-of-travel $FcH_n$ of each screen, are then determined in relation to a configuration parameter $J_n$ recorded previously. This parameter $J_n$ has a definition similar to the shift parameter $O_n$ defined in the previous driving mode, in as much as it corresponds to the deviation between the intrinsic reference position $R_n$ of a screen and the realignment position $RB_n$ of that screen. However, this parameter is not sufficient to make it possible to align the load bars of the screens of the group. In practice, if one and the same setpoint is sent to all the screens, given the non-alignment of the different reference positions $R_n$, the load bars of the shifted screens cannot be aligned with the other load bars without taking into account a parameter other than this configuration parameter. It is therefore necessary for the control to incorporate a shift parameter $I_n$. The shift parameter must be directly taken into account to ensure the alignment of the load bars of the screens of the group. It is determined according to the driving mode of the screens "n". According to this second driving mode, for each screen, the shift parameter $I_n$ corresponds to the deviation between the reference position $R_n$ which is equal to its top end-of-travel, $FcH_n$ in the example, and an arbitrary common reference position R. Thus, when a position setpoint X, expressed in relation to the common reference R, is sent, the setpoint is retranscribed for the screens of the group according to the shift parameter $I_n$. The target position for a screen "n" is corrected by this shift parameter and is $X_n = X - I_n$.

Figure 8:
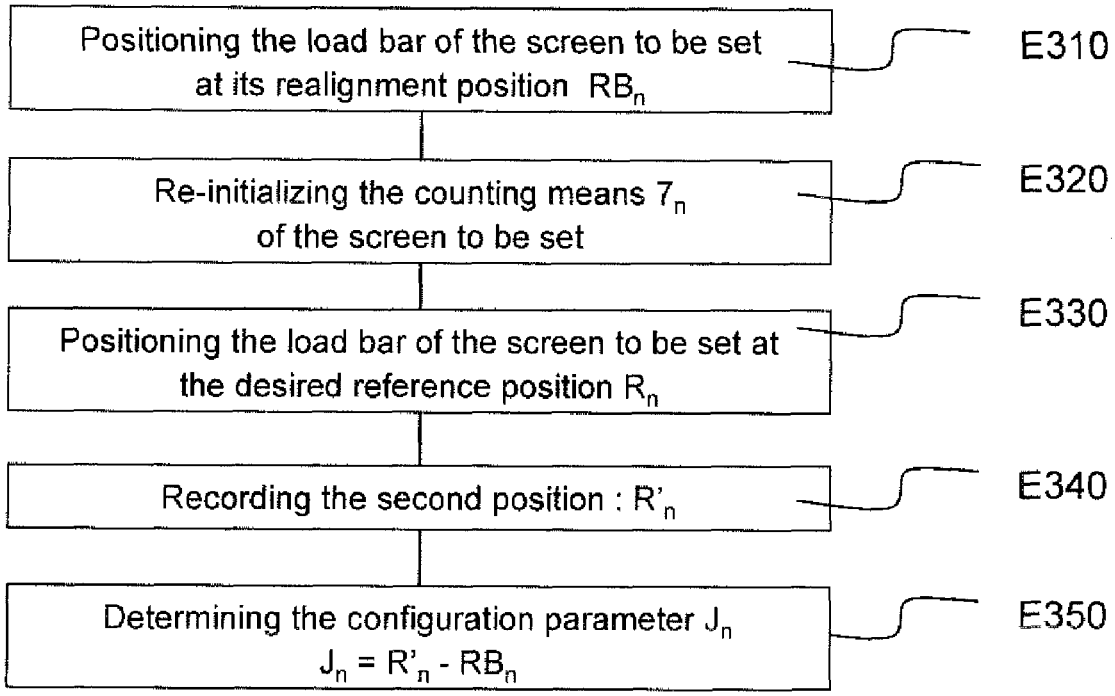
FIG. 8 is a flow diagram relating to the determination of the configuration parameter of the screens of the group.

The recording of the configuration parameter $J_n$ can be direct. It is illustrated in the FIG. 8 and is performed as follows:

In a first step E310, the load bar of the screen "n" to be configured is positioned in its realignment position $RB_n$.

In a second step E320, the counting means $7_n$ of that screen is initialized.

In a third step E330, the load bar of the screen to be configured is positioned at the level of the desired reference position $R_n$ which is preferably its top end-of-travel $FcH_n$.

In a fourth step E340, the position $R'_n$ is recorded.

In a fifth step E350, the configuration parameter $J_n$ corresponding to the difference between $R'_n$ and $RB_n$ ($J_n = R'_n - RB_n$ or $J_n = FcH_n - RB_n$) is then calculated.

The method of configuring the screens of the group according to this second driving mode also incorporates a step for determining the values of the shift parameters $I_n$. A first variant repeats the steps E110 to E150 defined previously. Then, the configuration method continues for each screen of the group with the steps E210 to E240, as defined previously. The method continues with a step E260 consisting in calculating the shift parameter $I_n$ to be associated with the screen to be configured. This parameter corresponds to the difference between K and the difference between $B'_n$ and $J_n$, that is $I_n = K - (B'_n - J_n)$.

In the case where the counting means $7_n$ is initialized in relation to its reference position $R_n$, the steps E210 and E220 can be eliminated and the calculation of the shift parameter $I_n$ in the step E260 is simplified and corresponds to the difference between K and $B'_n$, that is $I_n = K - B'_n$.

Figure 9:
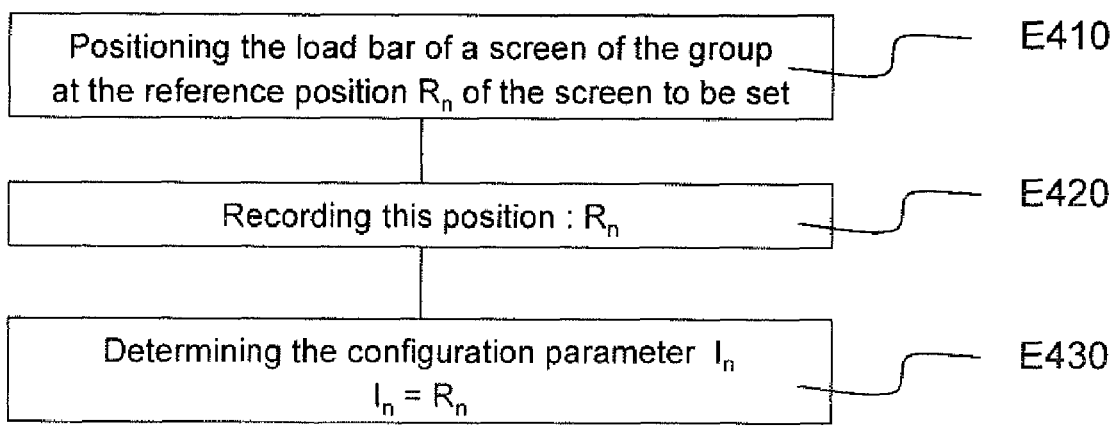
FIG. 9 is a flow diagram relating to the determination of the shift parameter by the inventive configuration method.

A preferable alternative is to use a screen selected from the screens of the group whose counting means $7_n$ is initialized in relation to its reference position $R_n$. It is preferable for all the screens to have an identical counting means $7_n$. As shown by FIG. 9, the configuration steps are then:

In a first step E410, the load bar of the selected screen is positioned at the reference position $R_n$ of the screen to be configured.

In a second step E420, the position $R_n$ is recorded.

In a third step E430, the shift parameter $I_n$ to be associated with the screen to be configured is then determined. This parameter corresponds to this position $R_n (I_n = R_n)$.

As previously, the recording of the parameters can be manual or assisted.

It is obvious that the driving modes described previously can easily be performed if the screens of the group have identical counting means $7_n$ and similar structures, notably their winding diameter. If this is not the case, it is essential to provide retranscription means that make the driving more complex.

Once the screens of the group are configured, the two proposed driving modes make it possible, following a general control, to obtain at least the alignment of the load bars of the screens that have been displaced.

Figure 10:
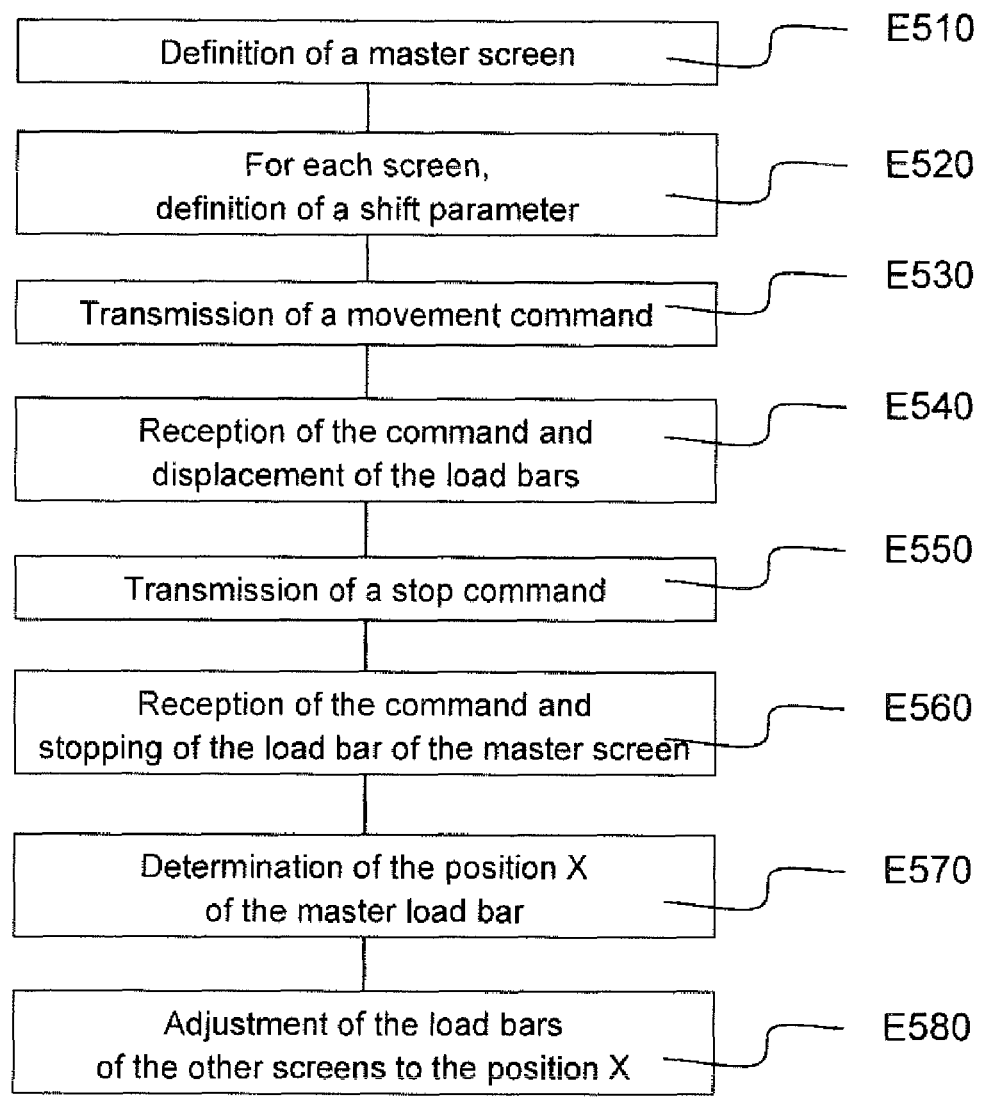
FIGS. 10 and 11 are flow diagrams of the grouped control method for a group including "shifted" screens configured according to the invention.

Such a grouped control method handling this function is illustrated in FIG. 10 and preferably comprises the following steps:

In a first step E510, a screen of the group, for example the screen 10, is defined as the master screen, that is, the screen on which the other screens of the group are based. Thus, the position of the load bars depends on the position of the load bar of the master screen. The other screens are qualified as "slaves" hereinafter, some of these screens being shifted, in relation to the master screen.

In a second step E520, a positioning parameter is assigned to each screen, including the master screen. This parameter reflects a condition that must be taken into account by the method in order to drive the shifted screens to always obtain the alignment of the load bars of the group in the intermediate position. According to the screen driving mode, the shift parameter is not defined in the same way, nor is it taken into account at the same moment.

In a third step E530, a movement command is sent to the different screens by a control member, such as a remote control, a switch or a programmed logic controller. This command can be a raise or lower command. Preferably, the command sent to each slave screen of the group is sent with a spatial or temporal shift in relation to the command sent to the master screen. The command can be sent by the automatic control mechanism driving the group or that driving the master screen.

In a fourth step E540, the command sent is received and processed by a receiver in order to execute it. Each screen of the group of screens is moved by an actuator generally comprising a receiver. The driving of the screens can be centralized on a single independent receiver. Each load bar then executes a displacement corresponding to the desired command. For a raise command, the movement corresponds to the retraction of the screen. Conversely, the screen is deployed for a lower command. The displacement of the load bars can be shifted between the master screen and the slave screens.

In a fifth step E550, a command to stop the movement is sent by the control member.

In a sixth step E560, the stop command of the step E550 is executed on the master screen only.

In a seventh step E570, the position X of the load bar 12 of the master screen 10 is determined thanks to the counting means $7_1$ associated with the screen. This position X is a relative position of the load bar 12 in relation to a reference position $R_1$ specific to the master screen.

In an eighth step E580, each slave screen whose load bar has been displaced receives the command to reach the position where the load bar of the master screen is located. This command is a command to displace the load bar of the slave screen "n" to reach a position $X_n$ in relation to a reference position $R_n$ specific to this screen. The position $X_n$ corresponds to the retranscription of the position X in the benchmark of the screen "n".

This retranscription is direct in the case where the reference position $R_n$ of a screen "n" is the common reference position R, as in the first driving mode mentioned hereinabove. The command is identical for all the screens. All the screens "n" must reach the position $X_n=X$.

In the second driving mode, if the reference position $R_n$ of a screen "n" is different from the reference position of the master screen, the position to be reached must be retranscribed in the benchmark of the screen "n". In this new benchmark, the command is therefore to reach the position $X_n=X-I_n$.

Alternatively, the command to reach the position $X_n$ is sent to all the screens, including those whose load bar has remained immobile before the step E550.

Figure 11:
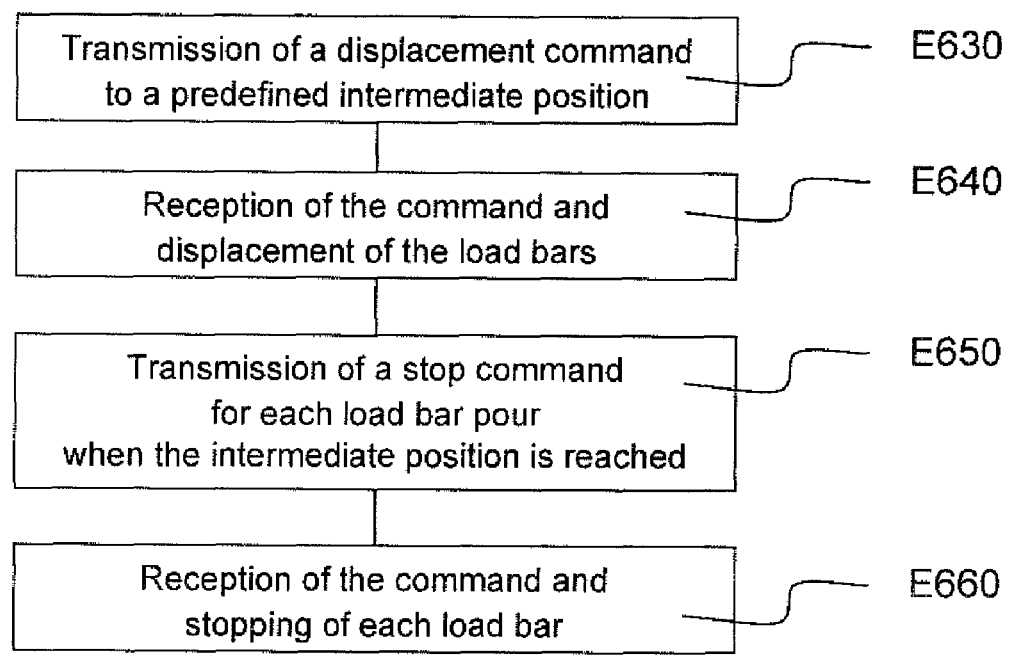

FIG. 11 shows a variant of the preceding grouped control method consisting in processing a control command to go to the predefined intermediate position following the steps E510 and E520.

In a step E630, a command to return to a predefined intermediate position is sent by a control member.

The step E640 corresponds to the step E540. The displacement corresponding to the desired command can be the retraction or the deployment of the controlled screen, depending on the position of its load bar. The time shift is not essential in this case.

In a step E650, a command to stop the movement is automatically triggered, for each screen, immediately its load bar reaches the predefined intermediate position.

In a step E660, the stop commands of the step E650 are executed at the appropriate movement.

As envisaged hereinabove, an enhancement consists in introducing a time shift when executing the movement of a slave screen in relation to a master screen. Such a time shift must be sufficient to ensure that the stop command of the slave screens is sent before the load bar of these screens has reached the desired stop position. In practice, the steps E560 and E570 induce a processing time that delays the execution of the step E580. If the slave screens and the master screen are displaced simultaneously, it is probable that the slave screens will exceed the desired stop position at the moment when the step E580 is executed. It is then necessary to order rewinding of these screens, which is less aesthetic, induces a more complex driving and greater electrical consumption. The time shift between the master screen and the slave screens makes it possible to avoid this rewind.

One alternative consists in triggering the movement of the load bar of a slave screen as soon as the load bar of the master screen has reached or exceeded the level of the load bar of this slave screen. It is then necessary for the driving mode of the screens of the group to incorporate a comparison between the position of the load bar of the master screen and the position of each load bar of the other screens of the group. Depending on the result of this comparison, the method will order, in the step 540 or 640, the movement of a stopped bar of a screen if the load bar of the master screen has reached or exceeded this stopped position depending on the travel of the master screen. The comparison can be performed in different ways. It can be a comparison based on a systematic measurement of the positions of the screen or on recordings of the positions of the load bars of the slave screens, the latter then being compared with the measurement of the position of the load bar of the master screen.

Provision can be made for the alignment function of the load bar of a screen with the other bars of the group to be activated only when this load bar has been shifted. Thus, a screen that has been closed manually may not be activated by the automatic control mechanism aligning the load bars. As a result, all the other load bars of the group will be aligned, except that of this screen. Conversely, it may be desirable for the alignment function to be activated for all the load bars of the screens of the group and so force the manoeuvre.

For example, it may be an automatic function performed at night or on non-working days.

The invention claimed is:

1. Method of configuring a group of motorized screens, each motorized screen of the group comprising a load bar that is displaced according to a defined travel, wherein it comprises a step consisting in determining for each screen "n" of the group, a shift parameter between a first reference position of the screen and a second reference position, one of the two reference positions being a reference position common to the screens of the group of screens.

2. Configuration method according to claim 1, wherein each screen of the group is coupled to a counting means which defines the relative position of the load bar in relation to the first reference position specific to the screen or in relation to the second reference position.

3. Configuration method according to claim 2, wherein the second reference position is a realignment position of the counting means specific to each screen and in that the first reference position is the reference position common to the group.

4. Configuration method according to claim 1, wherein the second reference position is the reference position common to the group of screens.

5. Configuration method according to claim 4, wherein the first reference position of a screen to be configured is a top end-of-travel position of this screen.

6. Configuration method according to claim 1, wherein it comprises a preliminary step consisting in defining a master screen for the group of screens, this master screen serving as a reference for the execution of the configuration method.

7. Configuration method according to claim 6, wherein the second reference position is the first reference position of the master screen.

8. Configuration method according to claim 1, characterized in that it comprises at least the following basic steps:
   i). positioning the load bar of a selected screen from the screens of the group of screens at a common reference position of the group;
   ii). recording this common reference position;
   iii). positioning the load bar of the selected screen in a configuration position corresponding to a particular position of the load bars of the screens to be configured;
   iv). recording this configuration position;
   and, for each screen of the group,
   v). positioning the load bar of the screen to be set at the configuration position of the step iii);
   vi). recording this third position; and
   vii). using these three recorded positions to determine the shift parameter of the screen to be configured.

9. Configuration method according to claim 1, wherein it comprises at least the following basic steps:
   a) positioning the load bar of a selected screen in a configuration position corresponding to a reference position of a screen to be configured;
   b) recording this configuration position,
   c) using this record to determine the shift parameter of the screen to be configured.

10. Automatic controller for controlling a group of screens incorporating means of implementing a configuration method according to claim 1.

11. Home automation installation comprising the automatic controller according to claim 10, wherein the motorized screens are fabric blinds or venetian blinds.

12. Grouped control method for the displacement of a group of screens comprising at least two motorized screens, each screen of the group comprising a load bar that is displaced according to a predefined travel, characterized in that to obtain, following a control command, at least the alignment of the load bars that have been displaced, this method takes into account at least a shift parameter between a first reference position of a screen and a second reference position, one of the two reference positions being a reference position common to the screens of the group of screens.

13. Grouped control method according to claim 12, wherein it comprises at least the following steps:
 a) following a command to move the group of screens, displacement of at least one load bar of a screen of the group; and
 b) following a stop command, positioning the load bar of each screen of the group or of each screen whose load bar has been shifted, so as to obtain at least the alignment of the load bars that have been shifted.

14. Grouped control method according to claim 13, wherein the movement command of the step a) is a command aiming to displace the load bar to a predefined position and in that the stop command of the step b) is then executed as soon as the predefined position is reached.

15. Grouped control method according to claim 13, wherein the alignment of the load bars of the step b) is obtained by the displacement of the load bar of each screen to a position determined in relation to a reference position specific to each screen.

16. Automatic controller for controlling a group of screens incorporating means for implementing a grouped control method according to claim 12.

17. Home automation installation comprising the automatic controller according to claim 16, wherein the motorized screens are fabrics blinds or venetian blinds.

* * * * *